United States Patent [19]

Iwanami

[11] Patent Number: 4,465,210

[45] Date of Patent: Aug. 14, 1984

[54] CIRCUIT FOR WASHING A WATER-FEEDING SYSTEM IN AUTOMATIC BEVERAGE VENDING MACHINES

[75] Inventor: Masao Iwanami, Suzuka, Japan

[73] Assignee: Fuji Electric Co., Ltd., Japan

[21] Appl. No.: 272,216

[22] Filed: Jun. 10, 1981

[30] Foreign Application Priority Data

Jun. 24, 1980 [JP] Japan .............................. 55-88584[U]
Sep. 18, 1980 [JP] Japan ............................ 55-132694[U]

[51] Int. Cl.³ .............................................. B67D 1/08
[52] U.S. Cl. .................................... 222/148; 222/318; 137/238
[58] Field of Search ................ 222/318, 148; 137/238, 137/240; 99/323.1, 323.2

[56] References Cited

U.S. PATENT DOCUMENTS 2,023,854 12/1935 Petricone ......................... 222/148 X
2,978,143 4/1961 Arnett et al. ................. 222/129.1 X
3,638,448 2/1972 Raymer ........................... 222/148 X
3,898,861 8/1975 McMillin ......................... 222/148 X
4,051,034 9/1977 Amon et al. .................... 99/323.2 X Primary Examiner—Joseph J. Rolla
Assistant Examiner—Kevin P. Shaver
Attorney, Agent, or Firm—Brumbaugh, Graves, Donohue & Raymond

[57] ABSTRACT

A novel washing circuit for use in an automatic beverage vending machine is disclosed. The circuit comprises a switching cock enabling communication between the upstream side of a water-feeding pump and one end of a return conduit. The other end of the return conduit is adapted to be detachably connected to the water supply nozzle of the vending machine. When the switching cock is opened and the return conduit is connected to the nozzle, the water-feeding pump of the machine can pump washing solution through the water-feeding system of the machine and facilitate cleaning thereof.

7 Claims, 11 Drawing Figures

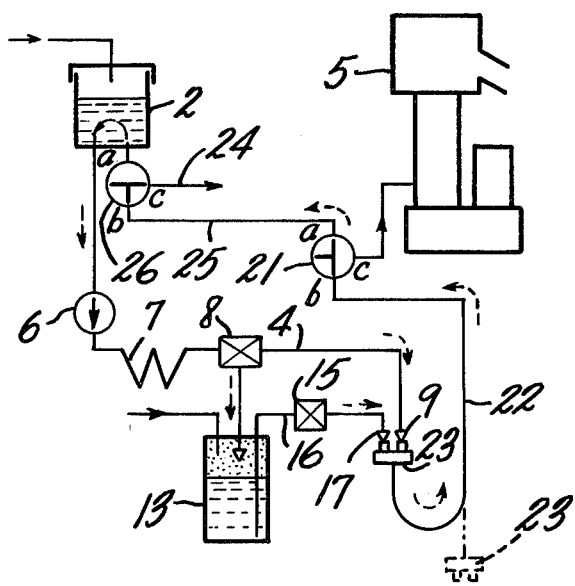
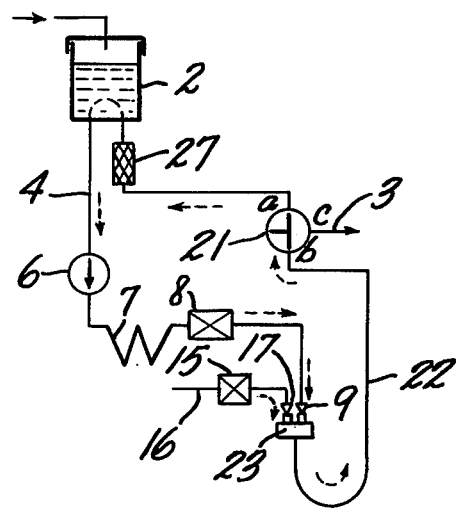
FIG. 8  FIG. 9
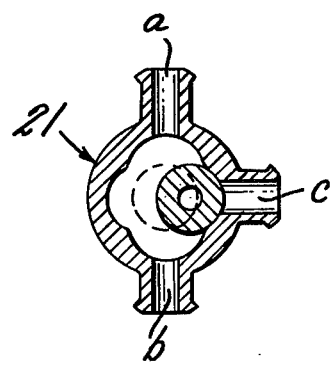
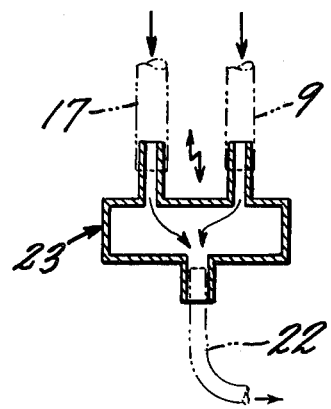
FIG. 10  FIG. 11

CIRCUIT FOR WASHING A WATER-FEEDING SYSTEM IN AUTOMATIC BEVERAGE VENDING MACHINES

TECHNICAL FIELD

This invention relates to automatic beverage vending machines for serving beverages in cups and more particularly to a novel circuit for washing a water-feeding system in an automatic beverage vending machine.

DESCRIPTION OF THE PRIOR ART

The operation for vending beverages is generally well known in the automatic vending machine art, and will be discussed briefly. Responsive to a given vending instruction or selection given by a customer, a valve, pump and ice making machine all forming part of the vending machine operate to supply cold water and ice together with carbonated water and syrup in predetermined amounts to a cup placed on a vending stage. Of course, not all of the automatic vending machines have an ice making machine and carbonator.

For hygienic reasons, it is required to regularly sterilize and wash the water-feeding system of automatic vending machines of this type. To wash the water-feeding system, a sterilizing solution (hereinafter simply referred to as "washing solution") is prepared. When the water-feeding system is to be washed, the washing solution is supplied to wash it.

According to the conventional method of washing the water-feeding system, the washing solution is prepared beforehand. Water is drained from the water-feeding pipes and then a cover is removed from a water reservoir. The washing solution is then poured into the water reservoir, where it remains for an interval of about 30 minutes. At the end of that interval, the valves are opened, the pump is started, and the washing solution is drained from the nozzle. Thereafter, tap water is supplied to the water reservoir and the above described operation is repeated to finish the washing operation.

According to the above-mentioned conventional washing method, the nozzle at the end of the water-feeding pipe opens directly to the vending stage, and the washing and sterilization are effected merely by having the washing solution remain in the water-feeding pipes for extended periods of time. Since extended periods of time are required to effect the washing, the vending operation must be interrupted for these extended time periods which of course results in significant downtime of the vending machine. Furthermore, during most of the washing step, the washing solution remains at rest and is not agitated or fluidized. Accordingly, the washing effect is minimal. Therefore, it would be desirable to provide a washing system which is capable of effectively performing the washing operation within a relatively shorter time period to reduce downtime of the vending machine.

SUMMARY OF THE INVENTION

The present invention overcomes the above-mentioned problems by providing a novel washing circuit for washing the water-feeding system within a shorter period of time.

According to the present invention, in washing the water-feeding system, a washing liquid supplied by a water-feeding pump into the water-feeding conduit is recovered from a nozzle and forcibly returned back to the intake side of the pump by a return conduit communicating with the upstream side of the water-feeding pump. The return conduit communicates with the water-feeding conduit via a switching cock, and is detachably connected to the nozzle of the water-feeding conduit.

The invention will be explained in more detail below with reference to embodiments shown in the drawings.

BRIEF DESCRIPTION OF THE DRAWINGS

FIG. 8 is a circuit diagram of a further embodiment of the invention shown in a washing state;

FIG. 9 is a circuit diagram of a still further embodiment of the invention shown in a washing state;

FIG. 10 is a cross-sectional view of a switching cock; and

FIG. 11 is a cross-sectional view of a connection fitting.

DETAILED DESCRIPTION OF THE PREFERRED EMBODIMENTS

The present invention relates to a novel circuit for washing a water-feeding system in automatic beverage vending machines which serve cool drinks in cups.

Figure 1:
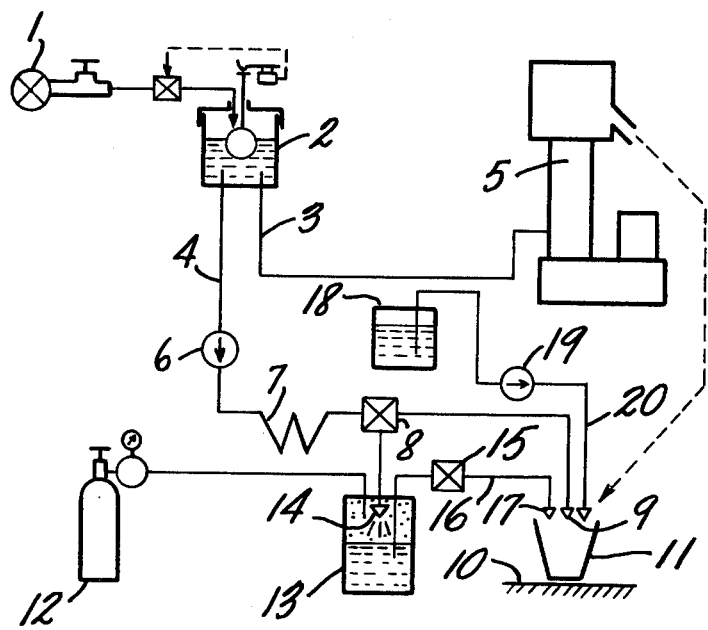
FIG. 1 is a circuit diagram of a conventional beverage system of an automatic vending machine which serves beverages in cups.

FIG. 1 illustrates a beverage system in a conventional automatic beverage vending machine which serves beverages in cups. As shown in FIG. 1, a water supply 1 such as a municipal water supply supplies water to a water reservoir 2 which is equipped with a float valve and which is installed in a housing. Two water-feeding pipes 3 and 4 are connected to the reservoir 2. Water-feeding pipe 3 is connected to an ice making machine 5 to supply water thereto. Water-feeding pipe 4 functions to supply cold water via a water-feeding pump 6, a cooling coil 7 which is immersed in a cold-water vessel (not shown), and a water-feeding valve 8, and has a nozzle 9 that is directed to a vending stage 10 on which is placed a cup 11.

In order to serve carbonated water, a container 12 of carbon dioxide gas is connected to a carbonator 13, the latter also receiving water from spray nozzle 14 via water-feeding valve 8. A carbonated water valve 15 regulates carbonated water from carbonator 13 through carbonated water-feeding pipe 16 to nozzle 17 which is directed to the cup 11 in parallel with the nozzle 9. Syrup, which is a raw material of beverage, is supplied into the cup 11 from a syrup tank 18 via a syrup pump 19 to a syrup-feeding pipe 20.

Figure 2:
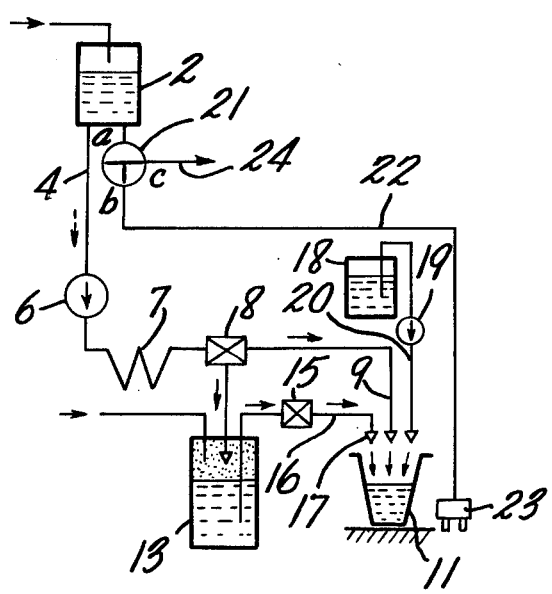
FIG. 2 is a circuit diagram illustrating a first embodiment of the vending machine of the present invention in a vending operation.
Figure 3:
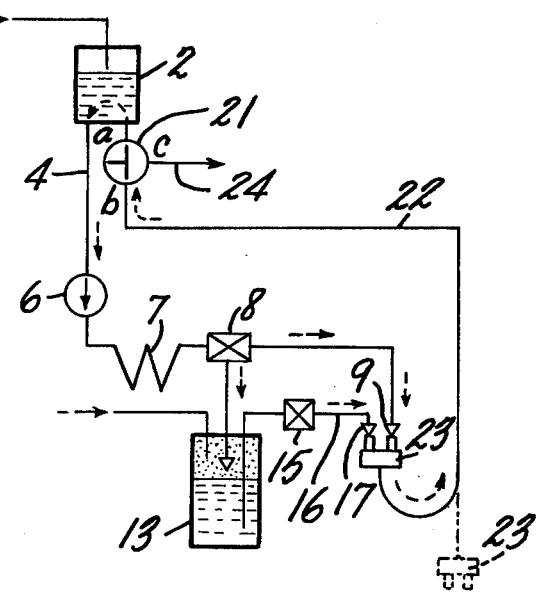
FIG. 3 is a circuit diagram illustrating the first embodiment of the vending machine during a washing operation.

FIGS. 2 and 3, respectively, illustrate the state of the machine when beverage is being vended, and when the water-feeding system is being washed, according to one embodiment of the present invention. To avoid repetition, the syrup-feeding system is not duplicated in the drawings of FIGS. 3–9.

Referring to FIG. 2, a three-way switching cock 21 is shown having its a port connected to the water reservoir 2 (located on the upstream side of the water-feeding pump 6), and its b port connected to a hose 22. Return conduit or hose 22 serves as a washing solution-return line and communicates with the cold water-feeding pipe 4 via the switching cock 21. The return conduit or hose 22 may be at least partially flexible, and has a connection fitting 23 at the tip thereof which can be detachably connected to nozzles 9 and 17 of the water-feeding pipes 4 and 16. The washing circuit is comprised of the members just described.

Turning now to FIG. 10, the three-way switching cock 21 will now be described. The housing of the cock has first, second and third ports a, b and c. By selectively moving a roller-type plug along a locus of the dotted line, the ports a, b and c can be communicated with each other in the combinations of: a-b, a-c, b-c or a-b-c.

With reference to FIG. 2, the first port a is connected to the water reservoir 2, the second port b is connected to the hose 22, and the third port c is connected to a drain hose 24. The connection fitting 23 is constructed in the form of a forked plug as shown in FIG. 11, and is adapted to be detachably connected to the nozzles 9 and 17.

The operation of the washing circuit will be described in more detail after a brief description of machine in the vending state. When the automatic vending machine is in the vending operation state, the connection fitting 23 of the hose 22 is separated from the nozzles 9 and 17 as shown in FIG. 2, and the switching cock 21 is selected to the switching position as diagramed so that the port a is not in communication with the ports b or c. Therefore, water in the water reservoir 2 is supplied to the cup 11 via the water-feeding pipe 4, and the automatic vending machine performs an ordinary vending operation.

When the water-feeding system is to be washed, the vending operation is interrupted, and all of water present in the water-feeding system is drained from the system. The connection fitting 23 is then connected to nozzles 9 and 17 as shown in FIG. 3, and the switching cock 21 is switched to a position so that the port a communicates with port b. A circulatory circuit is thus formed comprising water reservoir 2, water-feeding pump 6, water-feeding valve 8, nozzle 9, connection fitting 23, hose 22 and switching cock 21. Washing/sterilizing solution is then poured into the water reservoir 2, the water-feeding valve 8 is opened, and the water-feeding pump 6 is actuated. Therefore, the washing solution is forcibly pumped continuously through the circulatory circuit as indicated by dotted arrows, to thereby wash the water-feeding system.

With the above-mentioned forced circulatory washing system, the washing effect is superior to that of the conventional washing system, with the washing time also being significantly decreased. The superior washing effect has been proved by testing the system with actual machines.

When the washing operation is completed, the switching cock 21 is switched so that the port b communicates with the port c. Under this condition, the solution is fed by the pump 6 so that the used washing solution is drained from the system via the drain hose 24.

The carbonated water-feeding pipe 16 can also be washed. To effectuate this, the water-feeding valve 8 is switched from communication with nozzle 9 to communication with the carbonator 13. The pressure of carbon dioxide gas is then applied to the carbonator 13, and the carbonated water-feeding pipe 16 is washed in the same manner as water-feeding pipe 4 is washed. Thereafter, the used washing solution may be drained without using the drain hose 24, but instead by detaching the connection fitting 23 from the nozzles. In this case, the switching cock 21 need not be a three-way cock, but may simply be a two-port switching cock which opens and closes.

Figure 4:
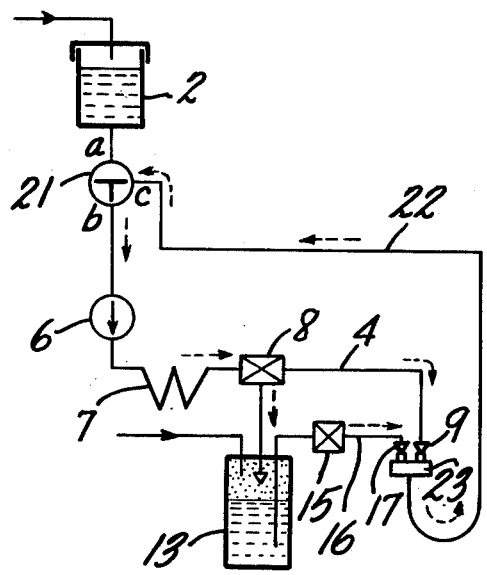
FIG. 4 is a circuit diagram of another embodiment of the invention shown in a washing state.
Figure 5:
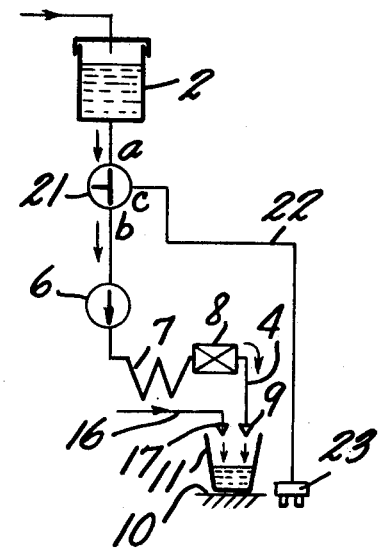
FIG. 5 is a circuit diagram of the embodiment of FIG. 4, but shown in a vending state.

The embodiment described in FIGS. 2 and 3 is directed to an arrangement wherein the switching cock 21 is connected to the water reservoir 2 independently from the water-feeding pipe 4. FIGS. 4 and 5 illustrate another embodiment in which the switching cock 21 is inserted directly in the water-feeding pipe 4 between the water-feeding pump 6 and the water reservoir 2. In this arrangement, the hose 22 is connected to the third port c of the switching cock 21, which is a three-way cock.

FIG. 4 illustrates the machine when it is being washed, and FIG. 5 illustrates the machine when it is in a vending state. As with the first described embodiment, the washing in this embodiment is performed by forcibly pumping the washing solution continuously through a circulatory circuit which passes through water-feeding pump 6, valve 8, nozzles 9 and 17, connection fitting 23, hose 22, switching cock 21 and back through water-feeding pump 6.

Figure 6:
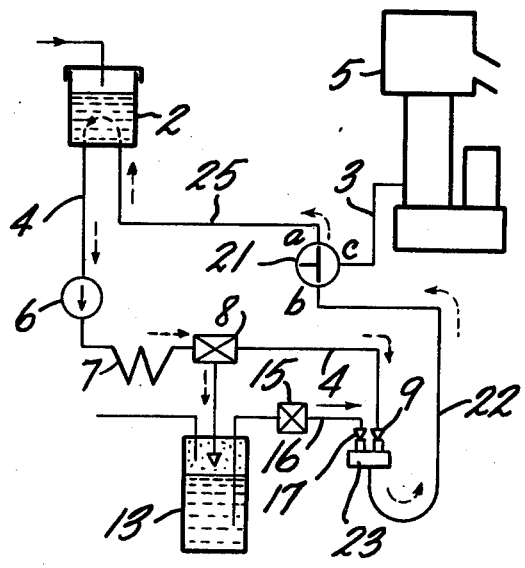
FIG. 6 is a circuit diagram of yet another embodiment of the invention shown in a washing state.
Figure 7:
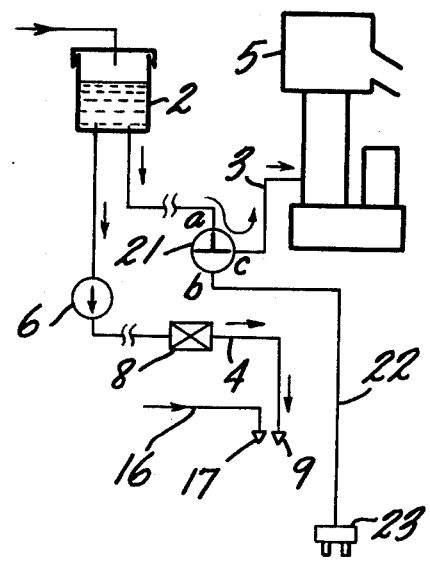
FIG. 7 is a circuit diagram of the embodiment of FIG. 6, but shown in a vending state.

FIGS. 6 and 7 illustrate another embodiment of a washing circuit similar to that of FIG. 2, but in which an ice making machine is combined with the water-feeding pipe, as will be described. In FIG. 2, the third port c of the switching cock 21 is connected to a drain hose 24, but in the embodiment of FIG. 6, the third port c is connected to a water-feeding pipe 3 which in turn communicates with a water-feeding port of the ice making machine 5. During the vending operation, the switching cock 21 is switched so that port a communicates with port c. Water is then supplied from the water reservoir 2 to the ice making machine 5.

To wash the water-feeding system of the embodiment of FIGS. 6 and 7, valves 8 and 15 are opened, the pump is driven, and residual water is drained from the water reservoir 2 and water-feeding pipes 4 and 16. Then, the switching cock 21 is switched so that the ports a, b and c communicate with each other. Thus, residual water is drained from the ice making machine 5, from the water-feeding pipe 3, and from a pipe 25 which connects the water reservoir 2 to the switching cock 21, through the hose 22. Then, referring to FIG. 6, the connection fitting 23 of the hose 22 is connected to the nozzles 9 and 17, and the switching cock 21 is switched to the position so that port a communicates with the port b. Thus, a circulatory circuit is formed which is similar to that of the aforementioned embodiment. The washing solution is then poured into the water reservoir 2 after which the valve is the opened and the pump 6 is operated. The washing solution is forcibly circulated through the water-feeding pipes 4 and 16 to thereby wash them. With the connection fitting 23 still being connected to the nozzles 9 and 17, the switching cock 21 is then switched to the position where the port b communicates with the port c, and the washing solution is pumped to wash the interior of the water-feeding pipe 3 and ice making machine 5, after which the solution can be drained from an outlet port of the ice making machine 5. Finally, the water reservoir 2 will be supplied with fresh water in place of the washing solution, and the operation is repeated in the same manner as mentioned above to finish the washing operation. According to this embodiment, the ice making machine 5 and the water-feeding pipe 3 can be washed in a series of washing steps.

When the pipe leading to the ice making machine 5 is not severely contaminated, the connection fitting 23 may be detached from the nozzles after the water-feeding pipe 4 has been washed, and the washing solution in the water reservoir 2 may be drained simply by gravity through the hose 22.

According to the aforementioned embodiments, during the washing operation the washing solution is circulated through the water-feeding system. Therefore, foreign matter, such as deposits which had adhered onto the inner walls of pipes of water-feeding paths, may become dislodged and circulate through the pipes together with the washing water. Consequently, deposit matter may enter into small clearances of the water-feeding pump 6, valve 8, valve 15 and clog one or more of these members. FIGS. 8 and 9 illustrate embodiments which deal with this problem.

In the embodiment of FIG. 8, a three-way drain cock 26 is inserted in the pipe 25 at a position relatively close to the water reservoir 2 to thereby remove suspended foreign matter such as deposits. The drain hose 24 has been connected to the third port c. During the ordinary vending operation, the drain cock 26 communicates the port a with the port b, but for the washing step, the drain cock 26 is switched so that the port b communicates with the port c, as shown in FIG. 8. The water-feeding pump 6 is operated during the initial washing period, and the washing solution circulatory circuit is formed by connecting the connection fitting 23 to the nozzles 9 and 17. Therefore, when foreign matter, such as deposits, is dislodged from the walls of the water-feeding pipes, the foreign matter will not flow into the water-feeding pump 6 or the water-feeding valve 8 via the water reservoir 2, but instead will be removed from the system through the drain cock 26 and the drain hose 24.

Since the ice making machine 5 does not work continuously, but makes large amounts of ice at one time, which is then stored in an ice-preserving chamber, water supplied to the ice making machine stays in the ice machine water supply pipe for a longer time period than the water in the water-feeding pipe 4. Therefore, deposits tend to build up more in the water-feeding pipe 3 than in the water-feeding pipe 4. Accordingly, it is important to drain part of water in the pipe 3 through the drain cock 26 in order to remove deposits from that pipe. It is preferable for the three-way cock 21 to be installed as close as possible to the ice making machine 5. After the ports b and c of the drain cock 26 have been in communication with each other for a suitable time period, the drain cock 26 is returned again to the position where the port a communicates with the port b, and the washing solution is forcibly circulated through the water-feeding system to continue the washing operation.

FIG. 9 illustrates a further embodiment in which a strainer 27 is provided (instead of the drain cock 26 of FIG. 8) in order to remove foreign matter. Therefore, suspended foreign matter, such as deposits which would otherwise flow toward the water reservoir 2 during the washing step, is captured by the strainer 27, and is thus prevented from entering the water-feeding pipe 4. In this manner, the pump and valves remain free from clogging and the like. Strainer 27 can be detachably connected for facilitating removal and washing thereof when the washing operation is completed. Of course, drain cock 26 or strainer 27 can also be applied to a circuit for washing water-feeding systems not equipped with an ice making machine, such as the systems shown in FIGS. 2 and 4.

The valves, pump and switching cock in the aforementioned embodiments can be manually operated by the operator during the washing steps, or automatically controlled according to a predetermined washing program. Further, in order to automatically carry out the washing according to a program, a tank of washing solution can be prepared beforehand in the automatic vending machine separately from the water reservoir. A jet pump can be installed in the washing circuit, to be operated during the step in which water is circulated in the circulatory circuit, so that the concentrated washing solution in the washing tank is sucked and then introduced into the water-feeding pipe.

When using a washing circuit according to the present invention, the washing effect is greatly enhanced as compared with the conventional washing system which effects the washing by having the washing liquid remain uncirculated in the system. Also, the time required for effecting the washing is greatly reduced over the conventional systems.

Although the invention has been described and illustrated with respect to specific embodiments thereof, many modifications and variations of such embodiments may be made by one skilled in the art without departing from the inventive concepts disclosed. Accordingly, all such modifications and variations are intended to be within the spirit and scope of the appended claims.

I claim:

1. In an automatic beverage vending machine having a water-feeding system comprising a water-feeding conduit, a water-feeding pump, a water-feeding valve, a carbonator connected to the water-feeding valve, a water nozzle connected to the water feeding valve and directed to supply water from a water reservoir to a cup on a vending stage, and a carbonated water nozzle connected to the carbonator and directed to supply carbonated water to a cup on the vending stage, a circuit for washing the water-feeding system, comprising:

a return conduit, a switching cock connected to one end of the return conduit and to the upstream side of the water-feeding pump;

the other end of the return conduit adapted to be detachably connected to said water nozzle and said carbonated water nozzle;

whereby washing liquid supplied into the water-feeding conduit is recovered from the water nozzle or the caronated water nozzle and is forcibly refluxed into the intake side of the pump via the return conduit and switching cock, to provide continuous circulation of washing fluid through the entire water-feeding system to thereby facilitate cleaning of the water-feeding conduit, the water-feeding pump, the water-feeding valve, the carbonated water nozzle and the water nozzle.

2. A circuit for washing a water-feeding system in automatic beverage vending machines according to claim 1, wherein the switching cock is connected to the water reservoir so that the reservoir is also washed as part of the water-feeding system.

3. A circuit for washing a water-feeding system in automatic beverage vending machines according to claim 1, wherein the switching cock comprises a three-way cock having two ports connected in the line of the water-feeding conduit between the water-feeding pump and the water reservoir, and a third port connected to the one end of the return conduit.

4. A circuit for washing a water-feeding system in automatic beverage vending machines according to claim 1, wherein the switching cock comprises a three-way cock having a third port connected to a drain hose.

5. A circuit for washing a water-feeding system in automatic beverage vending machines according to claim 1, further including an ice making machine and wherein the switching cock comprises a three-way cock having a third port connected to a water-feeding port of ice making machine so that the water-supply line to the ice-making machine is also washed as part of the water-feeding system.

6. A circuit for washing a water-feeding system in automatic beverage vending machines according to claim 5, wherein a drain cock is provided between the switching cock and the water reservoir to drain washing fluid and water from the system.

7. A circuit for washing a water-feeding system in automatic beverage vending machines according to claim 5, wherein a strainer is provided between the switching cock and the water reservoir.

* * * * *